Feb. 1, 1938.　　　　J. PHILLIPS　　　　2,106,959

POSITIVE PRESSURE COMPRESSOR

Filed May 13, 1936

INVENTOR,
JOHN PHILLIPS.
BY
Lippincott & Metcalf
ATTORNEYS.

Patented Feb. 1, 1938

2,106,959

UNITED STATES PATENT OFFICE 2,106,959

POSITIVE PRESSURE COMPRESSOR

John Phillips, Oakland, Calif.

Application May 13, 1936, Serial No. 79,502

2 Claims. (Cl. 230—153)

My invention relates to rotary compressors, and more particularly to a rotary compressor wherein a positive pressure may be maintained throughout the speed range of the device.

Among the objects of my invention are: To provide a rotary compressor giving a positive pressure output; to provide a rotary compressor of high efficiency at both high and low speeds; to provide an automatic seal for a rotary compressor; to provide a variable speed positive output rotary compressor; and to provide a simple and efficient means and method of sealing a rotary compressor.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing.

Figure 1:
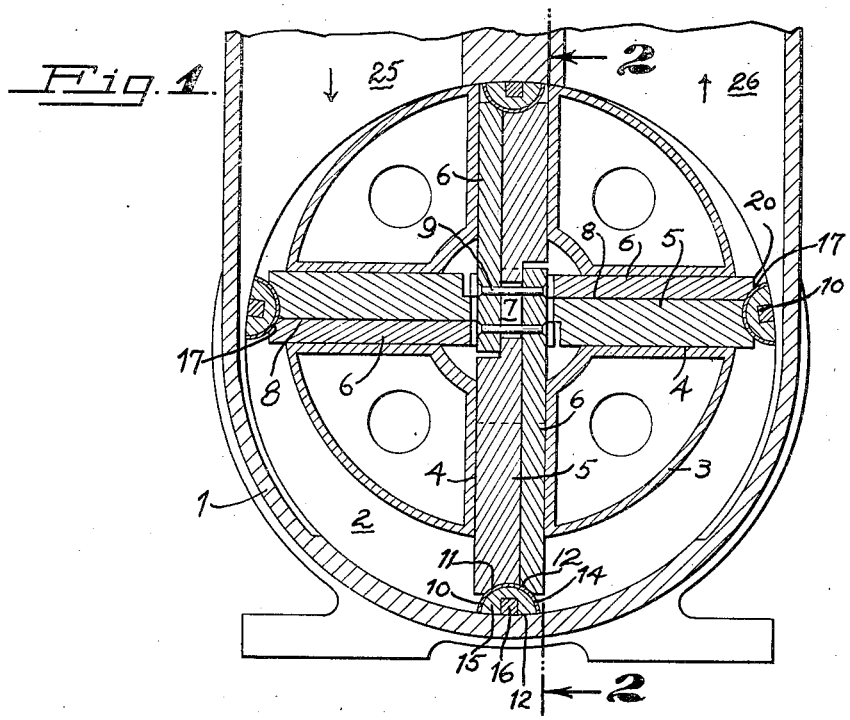
Figure 1 is a sectional view of a preferred form of my invention, somewhat diagrammatic, and reduced to lowest terms.
Figure 2:
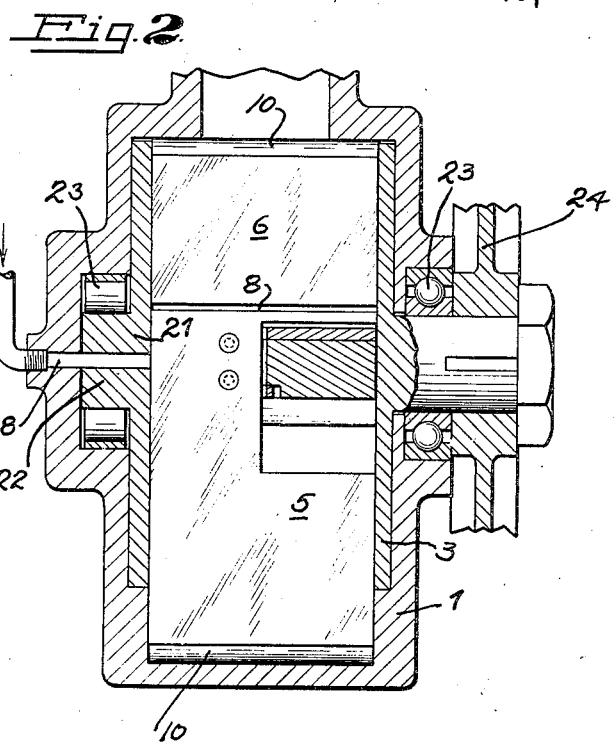
Figure 2 is a sectional view taken as indicated by the line 2—2 in Figure 1.

Rotary compressors have heretofore been more truly blowers than compressors. A rotary compressor, in order to have the advantages of a piston type pump, must deliver per revolution the same amount of air, irrespective of speed of rotation. There are many blowers in which no attempt is made to seal the spaces between blower blades. Other blowers are more positive in operation because various shoes are utilized on the ends of the rotating blades to form a more or less effective seal against the stationary wall of the compressor.

In general, however, all of these devices are efficient only at one certain speed. If they are high speed devices they fail as positive compressors at low speeds; if they are low speed devices they cannot run at high speeds, and if springs, centrifugal force or other similar means are utilized to force sealing vanes against the wall of the compressor, great wear takes place if rotational speeds are raised.

I have found, however, that I can utilize the output pressure of my device to create a force which is applied to the input of the device to create a suction seal even at slow speeds but which does not apply stresses or forces which are ruinous to the operation of the devices at high speeds. I have therefore provided a compressor which is operable as a positive pressure delivery device within a wide range of speeds without causing excessive wear.

My invention may be more fully understood by direct reference to the drawing:

A compressor casing 1 is provided, as is customary, with a compressor chamber 2 in which is mounted a smaller rotor cage 3, with its axis offset from the axis of the chamber in such a manner that at one side of the chamber the rotor substantially approaches the chamber wall. The rotor cage 3 is preferably lightened by being made hollow, and is usually bored out to save weight and is provided with crossed diametrical slots 4 in which two reciprocating main vanes 5 are placed, each of the main vanes being provided with a notch so that by engaging the notches both vanes will fit in the rotor slots 4. The main vanes are of course free to slide in the slots, and each vane is provided on the advance face thereof with a pair of fly vanes 6 connected together through an aperture 7 in each vane. The fly vanes on each main vane sit in slots 8 on opposite sides of the main vanes, and slots 8 are of sufficient diametrical length on each end of the vane so that there may be a slight diametrical motion. Motion of one vane, therefore, is communicated to the other through connecting pins 9.

On each terminal of each vane there is a sealing shoe 10, preferably having a substantially hemispherical section. This shoe fits into a groove 11 having substantially the same curvature as the shoe, and the sealing face 12 of the shoe is formed to have substantially the curvature of the chamber wall upon which it bears.

I prefer to utilize a composite shoe having an inner hemispherical steel shell 14, an intermediate fibre body 15, and a metal insert 16, the latter taking the greater part of the wear. This latter insert may be of a material known to form a good bearing with the material of the chamber wall. However, sealing shoe 10 also bears against a groove 17 on the inner side of each fly vane, this leaving an area 20 exposed to the gas pressure within the compression chambers. A cap 21 carrying a stub shaft 22 is then placed over the rotor to lock the vanes in place, and the rotor mounted within the chamber 2 on bearings 23. The rotor assembly may then be driven by any convenient means such as gear 24 so that air enters through inlet port 25 and is delivered under pressure through outlet port 26.

I prefer to so proportion the exposed area of the fly vanes that the fly vanes will act as a piston in order that the pressure developed in the output portion of the device will push the fly vanes toward the center of the device. The fly vane which is in the output position, therefore, will force its connected fly vane, which is then in the input position, against its related shoe 15, and will force the advancing edge of that shoe against the wall of the cylinder.

Thus, no matter how slowly the compressor is rotating, as long as pressure is maintained in the output of the device, suction will automatically be maintained on the input side of the device. Furthermore, the pressure in the output end of the device automatically tends to seal the shoe in the output to the wall. Therefore, the shoes, in all positions, are sealed, the important factor being that the shoe which is in the input position is always being pushed against the wall of the compressor by the pressure exerted by natural compression of the device itself. Thus, the pressure exerted is independent of speed of rotation; the pressure on the suction side increases as pressure on the output side increases, thus maintaining efficiency from very low speeds to very high speeds, and none of the shoe pressures materially increase with rotational speed, so that wear is greatly reduced at high speeds.

I also prefer to feed oil into the device through an axial conduit 18 in order that the oil may be distributed outwardly along the radial slots to lubricate the device.

I claim:

1. In a rotary compressor having connected and reciprocating main vanes and a casing defining a compression chamber, a pressure seal shoe on the termini of said vanes and a fly vane movable on each of said main vanes and contacting each terminal shoe, a portion of said fly vane being exposed to chamber pressure, said portion being so shaped that pressure in said chamber will apply force to the oppositely disposed shoe.

2. In a rotary compressor, a compression chamber, a pair of main vanes disposed therein at right angles to each other, fly vanes disposed slidably upon said main vanes, pressure seal shoes positioned upon the outer ends of said main vanes and positioned to be pressed against said chamber by action of said fly vanes, said fly vanes being so positioned and arranged as to transmit pressure from said compression chamber to a point diametrally opposite thereto, and means for utilizing said transmitted pressure to force said pressure shoes against said compression chamber.

JOHN PHILLIPS.